United States Patent
Hoshino et al.

(10) Patent No.: US 9,643,444 B2
(45) Date of Patent: May 9, 2017

(54) IDENTIFICATION MEDIUM

(71) Applicant: NHK SPRING CO., LTD., Yokohama-shi, Kanagawa (JP)

(72) Inventors: Hidekazu Hoshino, Yokohama (JP); Itsuo Takeuchi, Yokohama (JP); Tohru Ida, Yokohama (JP); Seiya Shibuya, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 148 days.

(21) Appl. No.: 14/391,257

(22) PCT Filed: Mar. 14, 2013

(86) PCT No.: PCT/JP2013/057170
§ 371 (c)(1),
(2) Date: Oct. 8, 2014

(87) PCT Pub. No.: WO2013/153903
PCT Pub. Date: Oct. 17, 2013

(65) Prior Publication Data
US 2015/0062504 A1    Mar. 5, 2015

(30) Foreign Application Priority Data

Apr. 11, 2012    (JP) ................. 2012-090369

(51) Int. Cl.
*G02F 1/1335*    (2006.01)
*B42D 25/328*    (2014.01)
(Continued)

(52) U.S. Cl.
CPC ......... *B42D 25/328* (2014.10); *B42D 25/425* (2014.10); *G02F 1/0045* (2013.01);
(Continued)

(58) Field of Classification Search
None
See application file for complete search history.

(56) References Cited

U.S. PATENT DOCUMENTS

| 7,879,415 B2 | 2/2011 | Hoshino et al. |
| 2002/0051264 A1 | 5/2002 | Shiozawa et al. |
| (Continued) | | |

FOREIGN PATENT DOCUMENTS

| JP | A-09-034342 | 2/1997 |
| JP | A-2000-322665 | 11/2000 |
| (Continued) | | |

OTHER PUBLICATIONS

Nov. 23, 2015 Extended Search Report issued in European Patent Application No. 13776181.3.
(Continued)

*Primary Examiner* — Richard Kim
(74) *Attorney, Agent, or Firm* — Oliff PLC

(57) ABSTRACT

An identification medium can be affixed to cloth or leather products by sewing. A cholesteric liquid crystal layer on which an embossed surface for forming a hologram is formed, is sandwiched between a first supporting member and a second supporting member. A mounting region that can be affixed to clothing, etc., by sewing, is formed.

15 Claims, 3 Drawing Sheets

(51) Int. Cl.
  *G03H 1/02* (2006.01)
  *B42D 25/425* (2014.01)
  *G02F 1/00* (2006.01)
  *G02F 1/1333* (2006.01)
  *G09F 3/02* (2006.01)
  *G09F 3/14* (2006.01)
  *G03H 1/00* (2006.01)

(52) U.S. Cl.
  CPC .. *G02F 1/133305* (2013.01); *G02F 1/133528* (2013.01); *G03H 1/0244* (2013.01); *G03H 1/0252* (2013.01); *G03H 1/0272* (2013.01); G02F 2001/133541 (2013.01); G03H 1/0011 (2013.01); G03H 2222/31 (2013.01); G03H 2250/14 (2013.01); G03H 2250/34 (2013.01); G03H 2250/38 (2013.01); G03H 2250/40 (2013.01); G03H 2250/41 (2013.01); G03H 2270/12 (2013.01); G03H 2270/31 (2013.01); *G09F 3/02* (2013.01); *G09F 3/14* (2013.01); G09F 2003/0276 (2013.01); G09F 2003/0282 (2013.01)

(56) References Cited

U.S. PATENT DOCUMENTS

| | | | |
|---|---|---|---|
| 2008/0090029 | A1 | 4/2008 | Hoshino et al. |
| 2008/0136979 | A1 | 6/2008 | Hoshino et al. |
| 2010/0005694 | A1* | 1/2010 | Forte .................. A47G 1/0616 40/757 |
| 2011/0070409 | A1* | 3/2011 | Nishimaki .............. B32B 27/40 428/190 |
| 2011/0164205 | A1* | 7/2011 | Kashiwagi ........... G02B 5/0231 349/96 |

FOREIGN PATENT DOCUMENTS

| | | |
|---|---|---|
| JP | A-2005-331917 | 12/2005 |
| JP | 2006-103048 A | 4/2006 |
| JP | A-2006-215477 | 8/2006 |
| JP | A-2008-015682 | 1/2008 |
| JP | B2-4268336 | 5/2009 |
| WO | WO 00/13065 A1 | 3/2000 |

OTHER PUBLICATIONS

May 21, 2013 International Search Report issued in International Application No. PCT/JP2013/057170.

* cited by examiner

IDENTIFICATION MEDIUM

TECHNICAL FIELD

The present invention relates to an identification medium that can be used, for example, as a means for authenticating that an item is genuine (confirming authenticity) of garments, leather products, and various sewn products.

BACKGROUND ART

Patent Document 1 discloses a technique that transfers holograms onto clothing or synthetic leather. Patent Document 2 discloses an identification medium having an optical characteristic obtained by carrying out a hologram processing on a cholesteric liquid crystal.

Patent Document 1 is Japanese Unexamined Patent Application Publication No. Hei09-34342. Patent Document 2 is Japanese Patent No. 4268336.

Patent Document 1 discloses a technique in which an identification medium that can be used to directly confirm authenticity is formed on sewn products or leather products by transferring holograms to cloth or synthetic leather. However, recently, since holograms can be easily forged, anti-tampering effects cannot be expected, even if conventional holograms are used. In Patent Document 2, in view of the above-described circumstances, an identification medium that cannot be easily forged by forming a hologram on a cholesteric liquid crystal is provided. As a method for affixing this identification medium to objects, transferring, sticking or adhering can usually be used. These affixing methods are preferably used for affixing the identification medium on a smooth surface such as a surface of a passport, a card, a molded product made of resin or metal, a package, etc. However, when the identification medium is affixed on a rough surface such as a surface of a cloth or a leather product, there is a problem in that this identification medium may be illegally reused since peeling off is relatively easy.

In view of such circumstances, an object of the present invention is to provide an identification medium that can be affixed to cloth or leather products by sewing.

DISCLOSURE OF THE INVENTION

A first aspect of the present invention has an identification medium including a cholesteric liquid crystal layer on which a hologram is formed, a first supporting member and a second supporting member between which the cholesteric liquid crystal layer is sandwiched, and at least one thereof is made of transparent material which does not disturb circularly polarized light reflected from the cholesteric liquid crystal layer, and a mounting region that is sewn onto an object.

According to the first aspect of the present invention, a polarized state of circularly polarized light selectively reflected from the cholesteric liquid crystal layer is not disturbed on at least one of two sides, and therefore, optical characteristics of the cholesteric liquid crystal layer can be observed from at least one of the two sides. In addition, the identification medium is affixed by sewing on clothing, leather products, etc., using the mounting region.

As an object to which the identification medium is affixed, clothing or leather products that can be sewn using thread can be used; however, the object is not so limited, as long as it is made of material to which the identification medium can be affixed by sewing. Specifically, as an object, clothing, gloves, hats, socks, mufflers, shoes, bedding, blankets, towels, carpets, handkerchiefs, dish towels, bags, furniture, mats, various sports goods, etc., can be used. The identification medium of the present invention can be sewn to a part made of cloth or leather in these products using thread. Here, the leather may be genuine leather or synthetic leather.

A second aspect of the present invention has an identification medium according to the first aspect, in which at least one of the first supporting member and the second supporting member is a polyurethane film. Discomfort does not occur, even if the polyurethane film is affixed to clothing, leather products, etc., because it is soft and has good texture. In addition, optical characteristics of the cholesteric liquid crystal layer are not degraded since the polarized state of the transmitted light is not disturbed. Furthermore, it has water resistance, and as a result, durability in washing can be obtained, because of the water resistance.

A third aspect of the present invention has an identification medium according to the second aspect, in which the other of the first supporting member or the second supporting member is a cloth, and the mounting region is formed on a part of the cloth.

For example, when the first supporting member and the second supporting member are resin films and a part thereof is affixed to the object such as clothing by sewing using thread, strength of the part is relatively decreased in the same manner as in the case in which perforation is formed in the resin film. Therefore, when the identification medium is attempted to be separated by force from the object, there is a problem in that both supporting members are torn off from a part that forms the above perforation (that is, a part sewn using thread). According to the third aspect of the present invention, since the other supporting member is made of cloth, the strength is prevented from decreasing at the part, even if the part is sewn onto the object using thread.

According to the third aspect of the present invention, an identification medium that is superior in flexibility, strength, durability and texture (pleasant feel to the touch) can be obtained, since a base member is made of cloth. In particular, when the identification medium of the present invention is used as a woven label, the identification medium having the same texture as those of conventional general woven labels, can be obtained.

The cloth may be formed by weaving synthetic fibers such as nylon, polyester, etc. Of course, the cloth may be formed of other fibers. Additionally, the cloth may also be subjected to coloring, printing, embroidery, etc., at a part thereof.

A fourth aspect of the present invention has an identification medium according to the third aspect, further including a resin coating layer on the cloth. According to the fourth aspect of the present invention, a structure that is easily printed on cloth can be obtained. That is, printing on the cloth is often limited due to running of ink, etc.; however, it can be easily carried out by providing the resin coating layer so as to form an undercoating.

In general, common clothing can be subjected to washing (usual washing) using water and detergent and dry cleaning. However, there is a problem in that the adhesive may be deteriorated by coming into contact with cleaning solution, etc. In particular, this problem is substantial because in dry cleaning, organic solvent is used as the cleaning solution. According to the eighth aspect of the present invention, the resin coating layer functions as an infiltrating resistance layer that prevents infiltration of the cleaning solution, and therefore, this problem can be prevented from occurring.

A fifth aspect of the present invention has an identification medium according to the third aspect or the fourth aspect further including a third supporting member made of resin over the cloth. According to the fifth aspect of the present invention, a structure in which liquids are easily infiltrated into cloth can be obtained.

A sixth aspect of the present invention has an identification medium according to any one of the first aspect to the fifth aspect, further including an ink layer in which printing designation is overlappingly carried out on the cholesteric liquid crystal layer, in which the ink layer is visible over the cholesteric liquid crystal layer.

According to the sixth aspect of the present invention, an overlapped state of the hologram formed in the cholesteric liquid crystal layer and the printing designation of the ink layer can be observed. Here, the printing designation of the ink layer may exist on a part that does not overlap the cholesteric liquid crystal layer. According to the sixth aspect of the present invention, superior authentication function can be obtained by overlappingly observing the hologram designation having an optical characteristic of the cholesteric liquid crystal layer that selectively reflects the circularly polarized light at a specific center wavelength and in a specific turning direction and printing designation of the ink layer.

A seventh aspect of the present invention has an identification medium according to the sixth aspect of the present invention, further including a film for printing in which the ink layer is formed. According to the seventh aspect of the present invention, the printing can be easily carried out and can have high durability by using the film for printing, even when the compatibility between the supporting member and the ink is not good.

A eighth aspect of the present invention has an identification medium according to the seventh aspect of the present invention, in which the mounting region is sewn onto the object, in a state in which the film for printing is arranged between the cholesteric liquid crystal layer and the object to be sewn. According to the eighth aspect of the present invention, the film for printing which is inferior in texture (pleasant feel to the touch) will not contact the skin.

A ninth aspect of the present invention has an identification medium according to any one of the first aspect to the eighth aspect of the present invention, in which the first supporting member and the second supporting member have flexibility and can be bent anywhere. According to the ninth aspect of the present invention, a specific visual effect can be obtained when the identification medium is observed in a bent state.

The cholesteric liquid crystal layer exhibits a color shift, in the case in which a viewing angle is changed (in the case in which the cholesteric liquid crystal layer is observed at an angle). For example, when the cholesteric liquid crystal set to have characteristics which exhibit red selectively reflected from the front is observed while inclining obliquely from a vertical direction, a phenomenon in which the color of reflected light gradually shifts from red to orange toward a small wavelength side is observed. According to the ninth aspect of the present invention, by bending the identification medium, the cholesteric liquid crystal layer is bent, and the above color shift can be observed on two sides. With respect to this color shift, color tone changes depending on degree of bending. The color shift generated when the identification medium is bent is a unique phenomenon that cannot be reproduced by forgery, and superior authentication effects can be provided. For example, the color shift is produced on two sides of a part in which the cholesteric liquid crystal is arranged when the identification medium is bent, and the color of the hologram formed in the cholesteric liquid crystal layer changes due to color tone that changes depending on degree of bending. Furthermore, when viewed through a circularly polarized filter, the hologram may or may not exhibit this color change. This optical function cannot be reproduced by forgery, and it is a unique function that is specific to the identification medium.

According to the present invention, an identification medium is provided that can be affixed to cloth, leather products, etc., by sewing.

EXPLANATION OF REFERENCE NUMERALS

Figure 1:
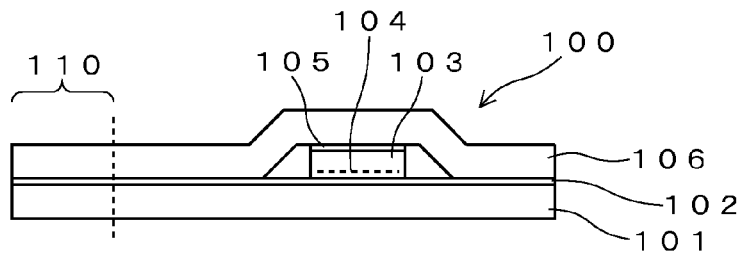
FIG. 1 is a cross sectional view showing an embodiment of the present invention.

Reference numeral 100 denotes an identification medium, 101 denotes a supporting film, 102 denotes an adhesive layer, 103 denotes a cholesteric liquid crystal layer, 104 denotes an embossed surface for forming a hologram, 105 denotes an adhesive layer, 106 denotes a supporting film, 107 denotes an ink layer, 108 denotes a printing film, 109 denotes an adhesive layer, 110 denotes a mounting region, 200 denotes an identification medium, 300 denotes an identification medium, 400 denotes an identification medium, 500 denotes an identification medium, 600 denotes an identification medium, 700 denotes an identification medium, 701 denotes fabric, 702 denotes a resin coating layer, 703 denotes an adhesive layer, 704 denotes a resin film layer, 705 denotes a printing layer, 800 denotes an identification medium, 910 denotes an identification medium, and 911 denotes a printing layer.

MODE FOR CARRYING OUT THE INVENTION

1. First Embodiment

Structure

FIG. 1 shows an identification medium 100. The identification medium 100 has a structure in a sheet shape (a film shape) covered on both surfaces thereof by supporting films 101 and 106, which are an example of a supporting material. As a material for forming the supporting films 101 and 106, thermoplastic elastomer is preferable from the point of view of a feeling of touch and the ability to sew the material. In this example, the support film 101 and 106 are formed by a film made of polyurethane, which is one type of thermoplastic elastomer. The supporting films 101 and 106 have a thickness of about 10 µm to 100 µm, and preferably have a thickness of about 10 μm to 50 μm. The supporting films 101 and 106 are selected from materials that are transparent (visible light passes through), have flexibility (softness), and are waterproof without disturbing the polarized state of visible light as it penetrates. As such a material, a polyurethane film is most preferable. As a material that can be used as the supporting films 101 and 106, an acrylic film, a polycarbonate film, a polyester film, a polyimide film, etc., can be used, other than the polyurethane film.

The supporting films 101 and 106 are adhered by an adhesive layer 102 formed of a transparent adhesive. A cholesteric liquid crystal layer 103 is sandwiched and held between the supporting films 101 and 106. The cholesteric liquid crystal layer 103 is set to have optical characteristics in which, for example, red right circularly polarized light is selectively reflected. Here, color (wavelength) of selective reflection and a turning direction of circularly polarized light that is selectively reflected are optionally set, and for example, green left circularly polarized light can be selectively reflected. A structure in which multiple cholesteric liquid crystal layers which selectively reflect colors having a different wavelength are stacked and a structure in which a circularly polarized filter layer is combined with a cholesteric liquid crystal layer, can be used.

The cholesteric liquid crystal layer 103 has a thickness of about 1 to 10 μm, and an embossed surface for forming hologram 104 is formed on one surface thereof. The embossed surface for forming hologram 104 is formed by pressing an embossing die to the cholesteric liquid crystal layer 103. According to the embossed surface for forming hologram 104, a hologram image can be observed by optical interference when reflected light of the cholesteric liquid crystal layer 103 is observed. As a hologram image, drawn patterns, character information, various pattern code designations, etc., can be used.

In the structure shown in FIG. 1, the cholesteric liquid crystal layer 103 is affixed to a supporting film 106 through a transparent adhesive layer 105, and it is affixed to a supporting film 101 through a transparent adhesive layer 102.

Production Method

First, a cholesteric liquid crystal layer 103 is formed on a substrate (not shown). After the cholesteric liquid crystal layer 103 is formed on the substrate (not shown), a hologram die (an embossing die) is pressed to an exposed surface thereof, and thereby an embossed surface for forming hologram 104 is formed. Next, the cholesteric liquid crystal layer 103 is peeled off from the substrate (not shown), and it is adhered to one surface of a supporting film 106 by a transparent adhesive layer 105. As a result, an intermediate member at a supporting film 106 side is produced. Here, when the substrate that supports the liquid crystal layer 103 is made of material that does not disturb a state of polarized light that will penetrate, the cholesteric liquid crystal layer 103 may be adhered to the supporting film 106 with the substrates.

On the other hand, a supporting film 101 having a transparent adhesive layer 102 is prepared, and an adhering surface thereof is adhered to the intermediate member at the supporting film 106 side as described above, and therefore, an identification medium 100 having a cross sectional structure shown in FIG. 1 is produced. Here, in FIG. 1, since there is the cholesteric liquid crystal layer 103, a state in which the supporting film 106 is deformed is shown in an exaggerated manner. However, this state is shown by drawings, and the supporting film 101 side may be deformed, and both of the supporting films 101 and 106 may be deformed.

Applied Embodiment

The identification medium 100 is affixed to an object using a mounting region (a sewing region) shown by reference numeral 110. The mounting region 110 is a part in which the supporting films 101 and 106 are adhered by the adhesive layer 102. For example, when an object is clothing or leather products, the part of the mounting region 110 is sewn to a part of the clothing or the leather products or to a tag attached on the clothing or the leather products by a thread. In particular, when a polyurethane film is used for the supporting films 101 and 106, usual sewing can be carried out, and mounting to the object can be carried out by sewing using a usual sewing technique. Here, as a method for affixing the identification medium 100 to the object, methods such as a hot melting method, etc., can be used. Furthermore, in FIG. 1, one side of the identification medium 100 is sewn; however, in a manner different from this embodiment, it is possible to sew two sides or all sides thereof.

Optical Function

The identification medium 100 has the same authentication function on both surfaces thereof. For example, it is viewed from above in the figures. Here, the cholesteric liquid crystal layer 103 is set to selectively reflect red right circularly polarized light. In this case, when the identification medium 100 is directly viewed in an environment in which natural light is irradiated, light reflected from the cholesteric liquid crystal layer 103 is observed, and therefore, a red hologram image is seen.

Then, when the identification medium 100 is observed through a right circularly polarized filter through which the right circularly polarized light selectively penetrates, the red hologram image is more clearly observed, since the right circularly polarized light which is selectively reflected from the cholesteric liquid crystal layer is selectively observed.

In addition, when the identification medium 100 is observed through a left circularly polarized filter through which left circularly polarized light selectively penetrates, the right circularly polarized light which is selectively reflected from the cholesteric liquid crystal layer 103 is cut off by the left circularly polarized filter. Therefore, the light reflected from the cholesteric liquid crystal layer 103 cannot be observed, and when it is viewed by an observer, the identification medium 100 is transparent, the hologram is not visible, and the identification medium 100 can be seen through an opposite side thereof.

The above optical function is the same as that in the case in which the identification medium 100 is viewed from below in the figure. Similar optical function can be obtained by irradiating the right circularly polarized light instead of observing through the right circularly polarized filter, or by irradiating the left circularly polarized light instead of observing through the left circularly polarized filter.

Advantages

Using a mounting region 110 without the cholesteric liquid crystal layer 103, the identification medium 100 can be sewn onto clothing or leather products using thread. In particular, when a polyurethane film is used for the support films 101 and 106, it can be easily sewn and has high strength in a sewn state. By sewing the identification medium 100 onto an object, it is difficult to remove the identification medium 100 from the object, and illegal reuse of the identification medium 100 can be prevented.

In addition, since the polyurethane film has flexibility and is waterproof, a structure in which the polyurethane film is used for the supporting films 101 and 106, is preferable to apply to clothing which is likely to contact skin and which is washable. Furthermore, since cholesteric liquid crystal material is inferior in abrasion resistance, a structure in which the material is sandwiched and sealed by polyurethane films is preferable from the point of view of durability.

The cholesteric liquid crystal layer 103 has the same optical characteristics on both surfaces, and therefore, when the identification medium 100 is used as a tag for clothing or leather products, it can be authenticated from both surfaces of the tag. It is useful to have a structure that can be authenticated from both surfaces thereof, because two sides of the tag attached to clothing are often inverted by bending.

Additionally, in the case in which the polyurethane film is used for the supporting films 101 and 106, flexibility that is sufficient to simply bend by bending with fingers, can be obtained. The cholesteric liquid crystal layer 103 has a color shift function in which color changes depending on viewing angle. However, when the identification medium 100 is also bent, a color shift can be observed, since viewing angles of the cholesteric liquid crystal layer 103 change. Therefore, for example, when the identification medium 100 is used as a tag for clothing, the color shift of the cholesteric liquid crystal layer 103 is observed by bending the tag using fingers, and thereby, it can be used for authentication. This color shift is strongly produced when selectively reflected light is observed using a circularly polarized filter, and as a result, in an observation through the circularly polarized filter, the identification medium 100 can be authenticated by observing color changes of hologram image when bending.

In addition, when the identification medium 100 is observed while bending, two sides thereof can be compared. In this case, one of the two bent sides is formed to be convex and the other is formed to be concave, and therefore, a color shift partially having gradation is observed, and moreover, shift states are different on the two sides and are uniquely viewed. The shift state in which the color shift partially showing gradation is observed on the two sides is characteristic and unique and cannot be reproduced by forgery, and a superior authentication function can be produced.

2. Second Embodiment

Figure 2:
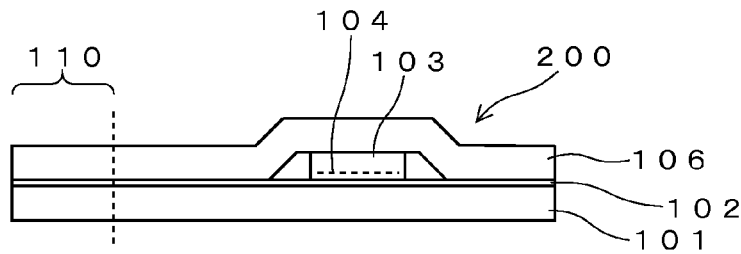
FIG. 2 is a cross sectional view showing an embodiment of the present invention.

FIG. 2 shows an identification medium 200 of another embodiment of the present invention. In the FIG. 2, parts denoted by the same reference numerals as those in FIG. 1 are equal to parts explained in FIG. 1. This is the same in embodiments shown in FIGS. 3 to 10 described below.

The identification medium 200 shown in FIG. 2 is different from the identification medium 100 shown in FIG. 1, and does not have a transparent adhesive layer 105. In the case of the identification medium 200, a transparent adhesive layer 102 is formed on a supporting film 101, and next, a cholesteric liquid crystal layer 103 in which an embossed surface for forming hologram 104 is formed is affixed thereon. Then, in this state, the identification medium 200 having a cross sectional structure shown in FIG. 2 is produced by adhering a supporting film 106 on an exposed surface of the transparent adhesive layer 102. The identification medium 200 has a simpler structure than that of the identification medium 100. An optical function and an advantage of the identification medium 200 are the same as those of the identification medium 100 shown in FIG. 1. Here, the embossed surface for forming hologram 104 may be formed at an upper side of the figure in the cholesteric liquid crystal layer 103 (the optical function that can be observed in the hologram image is the same, even if the embossed surface for forming hologram 104 is formed at an upper side or a lower side of the figure).

3. Third Embodiment

Figure 3:
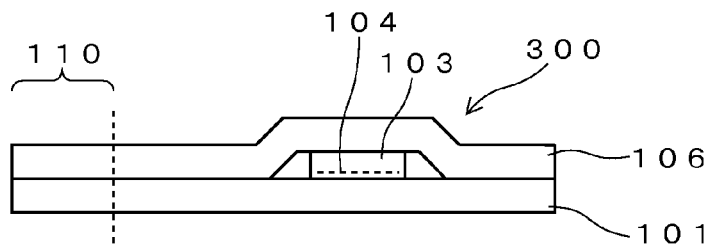
FIG. 3 is a cross sectional view showing an embodiment of the present invention.

FIG. 3 shows an identification medium 300 of another embodiment of the present invention. The identification medium 300 is different from the identification medium 100 shown in FIG. 1, in that it does not have transparent adhesive layers 102 and 105. In the case of the identification medium 300, a cholesteric liquid crystal layer 103 in which an embossed surface for forming hologram 104 is formed is sandwiched between supporting films 101 and 106, and the supporting films 101 and 106 made of polyurethane film are affixed to each other by self welding due to heating. The cholesteric liquid crystal layer 103 is physically sandwiched and held between the supporting films 101 and 106. The identification medium 200 has a simpler structure than those of the identification mediums 100 and 200. Optical functions and advantages of the identification medium 300 are the same as those of the identification medium 100 shown in FIG. 1.

4. Fourth Embodiment

Figure 4:
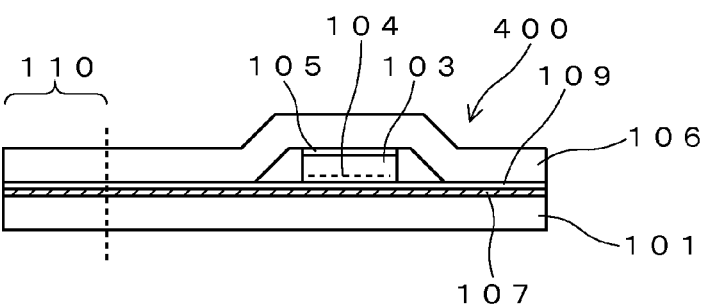
FIG. 4 is a cross sectional view showing an embodiment of the present invention.

FIG. 4 shows an identification medium 400 of another embodiment of the present invention. The identification medium 400 has a structure in which an ink layer 107 is added to the structure of the identification medium 100 shown in FIG. 1. In the identification medium 400, the ink layer 107 is provided on the supporting film 101 by direct printing. Designated content of the ink layer 107 is not limited, and it may be characters, drawn patterns, patterns, various code designations, etc. In addition, the color of the ink layer 107 is also not limited, and it may be monochrome or a combination of multiple colors. A transparent adhesive layer 109 is provided on the ink layer 107, a cholesteric liquid crystal layer 103 is affixed on this adhesive layer 109, and support films 101 and 106 are adhered by the adhesive layer 109.

FIG. 4 shows a state in which the ink layer 107 is provided on the entire surface; however, the identification medium 400 may be a state in which ink exists only in parts, and other parts without the ink allow penetration of visible light. Furthermore, in this embodiment, when the cholesteric liquid crystal layer 103 is observed through the ink layer 107, color and thickness of the ink layer 107 is set, so that the cholesteric liquid crystal layer 103 is seen through the ink layer 107. Therefore, when the identification medium 400 is observed from a back surface side (a lower side of the figure), the hologram of the cholesteric liquid crystal layer 103 can be observed through the ink layer 107. In other words, when the identification medium 400 is observed from a back surface side (a lower side of the figure), a state in which the hologram of the cholesteric liquid crystal layer 103 overlaps the designation of the ink layer 107 can be observed. This is the same as the case in which it is observed from a front surface side (an upper side in the figure). Here, a printing content of the ink layer 107 may be set to be a line drawing, a dot image or an image content with a clearance gap, so that the hologram of the cholesteric liquid crystal layer 103 is seen from the clearance gap of a part on which the ink is carried.

In the case in which the identification medium has a structure shown in FIG. 4, drawn patterns or characters of printing pattern of the ink layer 107 are added as identification information to a hologram image when viewed as light reflected from the cholesteric liquid crystal layer 103. The printing pattern of the ink layer 107 can be visually recognized regardless of the existence or turning direction of the circularly polarized filter. That is, when the identification medium is observed while switching right and left circularly polarized filters, an optical function for switching an observation state in which the hologram and the printing pattern are seen to overlap and an observation state in which the hologram is not seen and a printing pattern overlapping the (invisible) hologram are selectively seen, can be obtained.

In addition, designation of the printing pattern of the ink layer 107 does not exhibit color shift. Therefore, in an observation of a part in which the hologram image of the cholesteric liquid crystal layer 103 is overlapped with the printing pattern of the ink layer 107, the color of the hologram image changes by the color shift when the identification medium 400 is inclined or bent. However, a state in which the color of the designation of the printing layer 107 does not change is observed.

5. Fifth Embodiment

Figure 5:
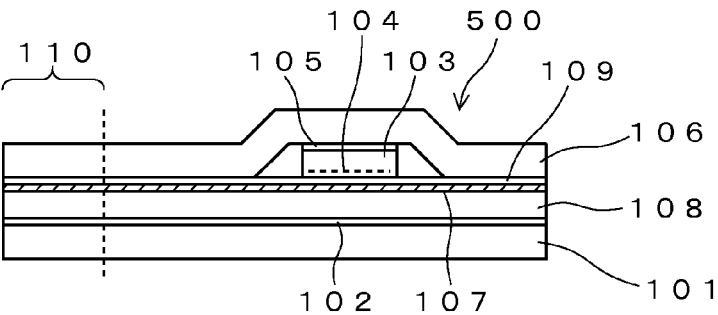
FIG. 5 is a cross sectional view showing an embodiment of the present invention.

FIG. 5 shows an identification medium 500 of another embodiment of the present invention. The identification medium 500 has a structure in which a film for printing 108 is added to the structure of the identification medium 400 shown in FIG. 4. The film for printing 108 is made of transparent material on which printing may easily be performed and which does not disturb polarization of transmitted light. As material made of the film for printing 108 that satisfies this condition, for example, a TAC film, polycarbonate film and acrylic film can be used. Here, as a film for printing 108, opaque material or transparent material which disturbs the polarization of the transmitted light may be used; however, in this case, the authentication function of the cholesteric liquid crystal layer 103 viewed from the back surface will be lost.

In the structure shown in FIG. 5, the film for printing 108 is affixed on a supporting film 101 by a transparent adhesive layer 102. An ink layer 107 is provided on the film for printing 108 by printing. A transparent adhesive layer 109 is provided on the ink layer 107, the cholesteric liquid crystal layer 103 is affixed by the adhesive layer 109, and a supporting film 106 is adhered by the adhesive layer 109.

In the case in which polyurethane film is used as a supporting film 101, it is difficult to support ink material on the polyurethane film, depending on the type of the ink. In such a case, the ink layer 107 is easily formed by adding a material film on which the ink may be preferably supported, as a film for printing 108.

6. Sixth Embodiment

Figure 6:
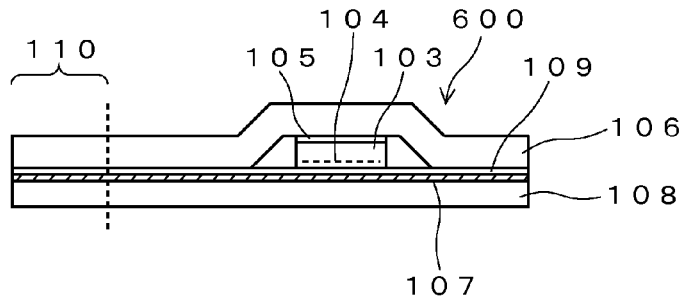
FIG. 6 is a cross sectional view showing an embodiment of the present invention.

FIG. 6 shows an identification medium 600 of another embodiment of the present invention. The identification medium 600 has a structure in which the supporting film 101 and the adhesive layer 102 are omitted from the structure of the identification medium 500 shown in FIG. 5. In the case in which the printing film 108 is made of opaque material or transparent material that disturbs the polarization of the transmitted light and in the case in which the identification medium is attached so that a back surface does not directly contact skin, the supporting film 101 can also be omitted, as described above. However, in this case also, an authentication function of the cholesteric liquid crystal layer 103 viewed from the back surface is lost.

When the identification medium 600 is attached to clothing, the supporting film 106 made of a polyurethane film is arranged so as to contact skin. That is, in a state in which the identification medium 600 is affixed to clothing, which is an object, by sewing, the printing film 108 is arranged between the cholesteric liquid crystal layer 103 and the clothing, and in this case, at a position which contacts cloth of the clothing. In this way, the identification medium 600 is used in a state in which the printing film 108 does not contact the skin and the supporting film 106 side contacts the skin, and texture of the polyurethane film can be maintained.

According to the identification medium 600, the texture of the polyurethane film can be maintained, printing designation can be easily carried out, and moreover, a simple structure can be formed by using the polyurethane film and as a result, production cost can be reduced.

7. Seventh Embodiment

Figure 7:
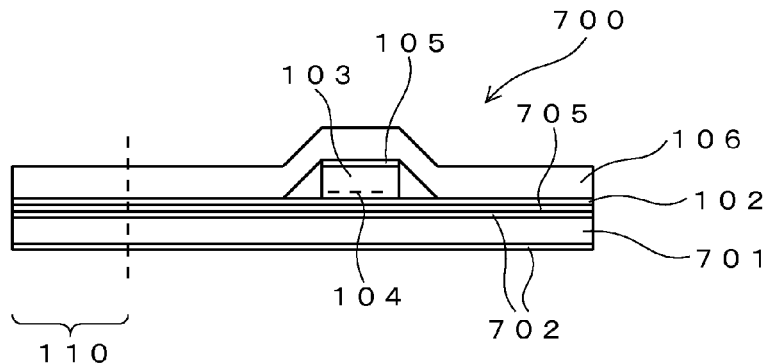
FIG. 7 is a cross sectional view showing an embodiment of the present invention.

FIG. 7 shows an identification medium 700 of another embodiment of the present invention. In the identification medium 700, cloth 701 is used as one supporting member, and a supporting film 106 made of resin is used as the other supporting member. Resin coating layers 702 are provided at an exposed surface side of the cloth 701 and an opposite side thereof. For example, the resin coating layers 702 are made of nylon resin. The resin coating layers 702 are formed by for example, impregnating liquids into the cloth 701 and by curing.

A printing layer 705 is provided close to the resin coating layers 702 at an upper side in the figure. The printing layer 705 is formed by printing ink. Characters or drawn patterns are formed at the printing layer 705. The resin coating layer 702 at an upper side in the figure functions as an undercoating of the printing layer 705. When the cloth 701 is used alone, it is difficult to print or it is not suitable for printing fine patterns, depending on the type of ink. However, a suitable state for printing is obtained by providing the resin coating layer 702.

In addition, the resin coating layer 702 functions also as an infiltrating resistance layer which prevents infiltration of liquids. For example, the clothing is generally washed using a detergent and water or is dry-cleaned. In this case, there are problems in that the printing layer 705, the adhesive layer 102, and the cholesteric liquid crystal layer 103 are deteriorated or degraded by coming into contact with a cleaning solution. In the structure shown in FIG. 7, these problems are prevented from occurring, since the resin coating layer 702 functions as an infiltrating resistance layer that prevents infiltration of cleaning solution.

The cloth 701 is cloth formed by weaving thread made of nylon or polyester. The cloth 701 in which the printing layer 705 is formed is adhered to the cholesteric liquid crystal layer 103 and the supporting film 106 by the adhesive layer 102 made of an adhesive. In addition, the same parts as those of the identification medium 100 shown in FIG. 1 correspond to the contents explained in FIG. 1.

In deciding authenticity, the identification medium 700 is observed from a side of the supporting film 106. In this case, when the identification medium 700 is observed through a right circularly polarized filter, right circularly polarized light selectively reflected from the cholesteric liquid crystal layer 103 is observed, a red hologram image due to an embossed surface for forming hologram 104 is clearly visible, and moreover, the drawn patterns of the printing layer 705 are simultaneously visible.

Then, when the identification medium 700 is observed through a left circularly polarized filter, right circularly polarized light reflected from the cholesteric liquid crystal layer 103 is cut off, and therefore, the cholesteric liquid crystal layer 103 appears transparent, the hologram image is not seen, and the drawn patterns of the printing layer 705 are preferentially seen. The decision on authenticity is carried out by switching this image.

The identification medium 700 is affixed to an object by sewing a mounting region (a sewing region) 110 onto the object using thread. Because the cloth 701 is cloth, perforations are formed at a sewn part, even if it is sewn onto the object by the thread, and a state in which it is easily torn off from the part is not formed. Therefore, durability against force in which the identification medium 700 is torn off from the state in which it is sewn onto the object, is high.

When a polyurethane film is used instead of the cloth 701, the perforation is formed at the sewn part using thread in the mounting region (the sewing region) 110, and strength at the part is lower than that at the other part. Therefore, when the identification medium 700 is separated from the object by applying more force, the probability that the polyurethane film will break at the sewn part depends on the additional force; however, it is higher than in the case in which the cloth 701 is used.

In addition, the resin coating layer 702 has a structure in which the printing layer 705 is easily formed since it is easily printed. Furthermore, by the resin coating layer 702, the cleaning solution is prevented from infiltrating when it is washed using water or is dry-cleaned, and therefore, the printing layer 705, the adhesive layer 102, the cholesteric liquid crystal layer 103, etc., can be prevented from deteriorating or degrading.

When permeability of visible light through the cloth 701 is low, it is difficult to see the hologram due to embossed surface 104 from the cloth 701 side. However, when a cloth 701 is used that is optically transparent through which the hologram due to the embossed surface 104 is visible, the resin coating layer 702 and the adhesive layer 102 are made of transparent material, and the printing layer 705 is formed so that an opposite side is visible therethrough, and therefore, the hologram due to the embossed surface 104 can also be seen from the cloth 701 side.

As a method for providing optical transparency to the cloth 701 so that the hologram due to the embossed surface 104 can be seen, a method in which a cloth having roughness through which visible light can penetrate is used, a method in which a fine thread which is woven in the above cloth having optical transparency is used, a method in which cloth is woven using transparent fiber, and a combination of these methods, can be used.

The identification medium 700 may have a structure in which the supporting film 106 is replaced with cloth. In this case, it is preferable that waterproofing processing, such as formation of a resin layer, be carried out, so that the cloth will not be infiltrated by liquids. Here, an embodiment in which cloth is used as a supporting member of the identification medium 100 is shown; however, supporting members in identification mediums of other embodiments may also be replaced with the cloth. For example, alone or combination, in the identification medium 100 shown in FIG. 1, the identification medium 200 shown in FIG. 2, the identification medium 300 shown in FIG. 3, the identification medium 400 shown in FIG. 4, the identification medium 500 shown in FIG. 5, and the identification medium 600 shown in FIG. 6, cloth may be used as at least one of the supporting members.

8. Eighth Embodiment

Figure 8:
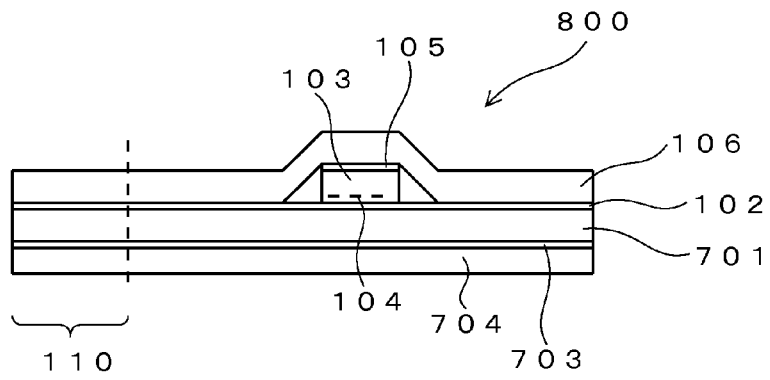
FIG. 8 is a cross sectional view showing an embodiment of the present invention.

FIG. 8 shows an identification medium 800 of another embodiment of the present invention. The identification medium 800 has a structure in which a resin film 704 is arranged, instead of the resin coating layer 702 in the identification medium 700, as an infiltrating resistance layer which prevents infiltration of liquids. The resin film 704 is an example of a third supporting member. The resin film 704 is made of a polyurethane film similar to the supporting film 106. The resin film 704 is adhered to cloth 701 by an adhesive layer 703.

By arranging the resin film 704, a cleaning solution can be prevented from infiltrating into the adhesive layers 102 and 703 during cleaning, and the adhesive layers 102 and 703 can be prevented from deteriorating or degrading. In addition, texture can be obtained by using a polyurethane film as the resin film 704. Here, an infiltrating resistance function for liquids in the structure shown in FIG. 7 can also be improved by arranging the resin film 704 at an outer side (a lower side) of the resin coating layer 703, in addition to the structure shown in FIG. 7.

9. Ninth Embodiment

Figure 9:
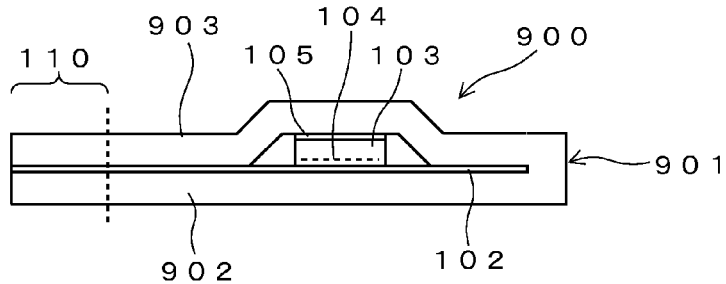
FIG. 9 is a cross sectional view showing an embodiment of the present invention.

FIG. 9 shows an identification medium 900. The identification medium 900 has a structure in which a supporting member which is folded in half one sheet of a supporting film 901 is used in the identification medium 100 shown in FIG. 1. That is, the supporting film 901 is folded in half, and the cholesteric liquid crystal layer 103 is sandwiched and held between the two sides of the folded supporting film 901. In this case, one supporting film 902 (one supporting member) and the other support film 902 (the other supporting member) are formed by the folded supporting film 901, and the cholesteric liquid crystal layer 103 is sandwiched and held therebetween. As a foldable supporting film, for example, a polyurethane film can be used. Furthermore, as a foldable supporting material, cloth can be used, and this cloth is folded and a cholesteric liquid crystal layer can be held therebetween.

10. Tenth Embodiment

Figure 10:
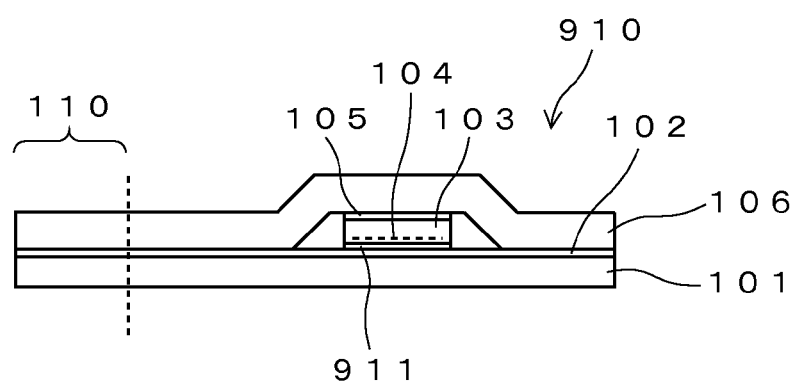
FIG. 10 is a cross sectional view showing an embodiment of the present invention.

FIG. 10 shows an identification medium 910. The identification medium 910 is an example in which a printing layer 911 is provided in the identification medium 100 shown in FIG. 1. In this case, the printing layer 911 is formed by printing on the cholesteric liquid crystal layer 103. The printing on the cholesteric liquid crystal layer 103 is carried out, for example, using an ink jet method.

In the printing on the polyurethane film, there is a problem in that it is difficult to form a good printing film when compatibility between polyurethane and the ink is not good. Printing designation can be added to the hologram designation of the cholesteric liquid crystal layer in the structure shown in FIG. 1 by directly printing on the cholesteric liquid crystal layer 103 in the same manner as the identification medium 910, even if a member for forming a base of the printing is not further used.

The present invention can be used for confirming authenticity.

The invention claimed is:
1. An identification medium comprising
   a cholesteric liquid crystal layer on which a hologram is formed, a first supporting member and a second supporting member between which the cholesteric liquid crystal layer is sandwiched, and at least one thereof is made of transparent material which does not disturb circularly polarized light reflected from the cholesteric liquid crystal layer, and a mounting region to be sewn onto an object, the first supporting member and the second supporting member extending to the mounting region and being adhered directly to each other by an adhesive layer in the mounting region, wherein the first supporting member is a polyurethane film or a cloth, and the cholesteric liquid crystal layer is affixed to both of the first supporting member and the second supporting member by adhesive layers.

2. The identification medium according to claim 1, further comprising a resin coating layer on the cloth.

3. The identification medium according to claim 2, further comprising a third supporting member made of resin over the cloth.

4. The identification medium according to claim 3, further comprising an ink layer in which printing designation is overlappingly carried out on the cholesteric liquid crystal layer, wherein the ink layer is visible over the cholesteric liquid crystal layer.

5. The identification medium according to claim 2, further comprising an ink layer in which printing designation is overlappingly carried out on the cholesteric liquid crystal layer, wherein the ink layer is visible over the cholesteric liquid crystal layer.

6. The identification medium according to claim 1, further comprising a third supporting member made of resin over the cloth.

7. The identification medium according to claim 6, further comprising an ink layer in which printing designation is overlappingly carried out on the cholesteric liquid crystal layer, wherein the ink layer is visible over the cholesteric liquid crystal layer.

8. The identification medium according to claim 1, further comprising an ink layer in which printing designation is overlappingly carried out on the cholesteric liquid crystal layer, wherein the ink layer is visible over the cholesteric liquid crystal layer.

9. The identification medium according to claim 8, further comprising a film for printing in which the ink layer is formed.

10. The identification medium according to claim 9, wherein the mounting region is sewn onto the object, in a state in which the film for printing is arranged between the cholesteric liquid crystal layer and the object to be sewn.

11. The identification medium according to claim 1, wherein the first supporting member and the second supporting member have flexibility and can be bent anywhere.

12. The identification medium according to claim 1, wherein the mounting region is provided at one side of the identification medium.

13. The identification medium according to claim 1, wherein the first supporting member is configured to be contactable with skin.

14. An identification medium comprising a cholesteric liquid crystal layer on which a hologram is formed, a first supporting member and a second supporting member between which the cholesteric liquid crystal layer is sandwiched, and at least one thereof is made of transparent material which does not disturb circularly polarized light reflected from the cholesteric liquid crystal layer, and a mounting region to be sewn onto an object, the first supporting member and the second supporting member extending to the mounting region and being adhered directly to each other by an adhesive layer in the mounting region, wherein the first supporting member is a polyurethane film.

15. The identification medium according to claim 14, wherein the first supporting member is configured to be contactable with skin.

* * * * *